US006423355B1

(12) United States Patent
Lewis et al.

(10) Patent No.: US 6,423,355 B1
(45) Date of Patent: Jul. 23, 2002

(54) IMBIBANT GRAINS FOR BAKERY AND OTHER USES

(75) Inventors: David Adrian Lewis; Victor Marcus Lewis; Deborah Ann Lewis, all of Rushcutters Bay (AU)

(73) Assignee: Byron Australia Pty Ltd., New South Wales (AU)

( * ) Notice: Subject to any disclaimer, the term of this patent is extended or adjusted under 35 U.S.C. 154(b) by 0 days.

(21) Appl. No.: 09/600,677

(22) PCT Filed: Dec. 17, 1998

(86) PCT No.: PCT/AU98/01040

§ 371 (c)(1),
(2), (4) Date: Jul. 20, 2000

(87) PCT Pub. No.: WO99/37169

PCT Pub. Date: Jul. 29, 1999

(30) Foreign Application Priority Data

Jan. 21, 1998 (AU) ............................................... PP1466

(51) Int. Cl.$^7$ .............................. A21D 2/00; A23L 1/10
(52) U.S. Cl. ......................... 426/93; 426/293; 426/309; 426/555; 426/622; 426/626; 426/629
(58) Field of Search ........................... 426/93, 293, 309, 426/555, 622, 626, 629

(56) References Cited

U.S. PATENT DOCUMENTS

| 953,946 | A | * | 4/1910 | Finkler ........................ 426/622 |
| 3,851,085 | A | * | 11/1974 | Rodgers et al. ............. 426/373 |
| 3,961,092 | A | * | 6/1976 | Forest et al. ................ 426/331 |
| 3,962,475 | A |   | 6/1976 | Forest et al. ................ 426/331 |
| 3,974,298 | A | * | 8/1976 | Cauvain et al. ............. 426/553 |
| 4,208,433 | A | * | 6/1980 | Barham, Jr. et al. .......... 426/69 |
| 4,927,660 | A | * | 5/1990 | Sano ........................... 426/618 |
| 5,846,590 | A | * | 12/1998 | Malkki et al. ............... 426/443 |
| 6,042,863 | A | * | 3/2000 | George et al. .............. 426/484 |

FOREIGN PATENT DOCUMENTS

AU 42031 6/1980

OTHER PUBLICATIONS

Tang, J. et al., "Moisture–Absorption Characteristics of Laird Lentils and Hardshell Seeds" *Cereal Chemistry*, vol. 71, No. 5:423–428 (1994).

Srivastava, V. et al., Influence of Soaking on Various Biochemical Changes and Dehusking Efficiency in Pigeon pea (Cajunus cajan L.) *Journal of Food Science and Technology*, vol. 25, No. 5:267–271 (1988).

Sowbhagya, C.M., et al., "Hydration, Swelling and Solubility Behaviour of Rice in Relation to Other Physiochemical Properties" *J. Sci. Food Agric.*, vol. 64:1–7 (1994).

Fast et al., "American Association of Cereal Chemists, Inc.," *Breakfast Cereals and How They Are Made* pp 39–40 (1993).

* cited by examiner

Primary Examiner—Nina Bhat
(74) Attorney, Agent, or Firm—Scully, Scott, Murphy & Presser

(57) ABSTRACT

There is provided a grain suitable for use in baked products and a method for producing the grain in which the grain has been preconditioned by physical action sufficient to induce an internal capillary network without causing the grain to fragment. The grain is subsequently treated with an osmotically active solute which provides the grain with rapid imbibition characteristics. The treated grain, when used in baked products, results in a baked product having improved shelf stability and antistaling properties.

28 Claims, No Drawings

IMBIBANT GRAINS FOR BAKERY AND OTHER USES

This application claims benefit under 35 U.S.C. 371 of PCT/AU98/01040 filed Dec. 17, 1998.

FIELD OF THE INVENTION

The present invention relates to grains (as hereinafter defined) having substantially enhanced capabilities of imbibing moisture and thus having enhanced suitability for use in various bakery products. The present invention also relates to methods for the preparation of grains having substantially enhanced moisture imbibing capability or potential. The products of tile invention may be called inibibant grains.

BACKGROUND TO THE INVENTION

Grains, seeds and particulate fractions derived from grains and seeds are used widely for addition to bakery products—breads, biscuits, muffins, cookies and the like. These grains, seeds and particles derived from them, all of which are hereafter referred to simply as "grains", when added to bakery products provide nutrition, variety of appearance and novel eating texture. Grains may comprise for example whole grains of wheat, rye, barley, oats, rice, soy, triticale or other seeds such as linseed or sunflower, nuts or particulates such as maize grits, kibbled preparations prepared from rye, barley, soy, wheat or oats and the like. Use of grains which contribute unique colour effects such as yellow maize grits, dark rye, linseed, triticale and red and purple wheats are particularly favoured by consumers.

It is well understood by processors of bakery products containing grains that these grains in the final products as sold to consumers should have become softened by some means before or during the baking process. For example if whole grains of wheat are added to a bread dough, they will remain very hard since their ability to imbibe moisture from the dough mix is minimal. The grains within breads produced in this way will be very hard and dry in the crust—leading to potential for damage to the teeth of consumers. Even the grains in the inside part of the bread (tie "crumb") remain hard and unacceptable, though less hard than in the crust. Furthermore, these whole grains continue to absorb moisture slowly from the rest of the baked product during storage. This slow and delayed moisture absorption by the grains leads to premature staling of tile baked product as a consequence of this moisture migration.

Up until tile present time, several methods have been used in order to seek to improve the tenderness of grains used in baked products. Examples of these known methods are as follows:

a) Unprocessed grains can be pre-soaked in water for up to several hours prior to addition to the dough or mix. This process is both laborsome, and hazardous in that microorganisms can develop rapidly in soaking grain, with resultant negative effects on wholesomeness and quality of final baked product. It also requires soaking tanks, space and effluent disposal.

b) Unprocessed grains can be steamed and then bumped by passing between rolls of a roller mill. This is an improved process relative to using unprocessed grains, but the results are still less than ideal in the finished products as moisture absorption is too slow, and the rolled grains are fragile and tend to break up during kneading.

c) Unprocessed grains can be preconditioned to a specific moisture content, then subjected to a rapid increase in temperature in a moving airstream. Temperatures of 250° C. to 600° C. or higher are needed to induce a slight degree of expansion of the grains. The grains treated by this process are tenderised to some degree, but do not absorb moisture from the dough any more readily than grains which have been steamed and bumped. They do however remain integral. Special equipment and much energy is required to treat grains in this way. Grain colour and flavour is negatively affected by such high temperature treatment. Tendency to rancidity on storage can result from such high temperature treatment.

d) Unprocessed grains can be reduced in size, such as by kibbling, passing through a groat cutter or by milling to produce grits of a nominated size. In this way the grain particles present a greater surface area than a whole grain, and the particles are not wholly sheathed by a bran layer as in whole grains. However, particles still do not absorb enough moisture to give a very tender product, do not have the appearance of whole grains and continue to absorb moisture from the crumb resulting in premature staling, as described above.

Of the above methods, use of fully presoaked grain gives the best results to produce tenderness in grains within the crumb. However, grains within the crust dry out during baking and become unsatisfactorily hard. What is more, fully presoaked grain requires several hours of preparation and accordingly is inconvenient and requires premeditated action.

As explained above there are problems associated with prior art methods of preparing grains suitable for use in baked products. Preferably the grains used in bakery products should possess the following attributes:

a) Grains should be capable of rapid absorption or imbibition of moisture from a dough or batter such that they become substantially fully imbibed in the freshly baked product.

b) Further absorption by the grains of moisture on storage of die finished baked product should be minimal so as not to induce premature staling of the baked product.

c) Grains should remain tender and friable if during baking they become fully dried out, as in the crust of a loaf of bread. They should, of course maintain tenderness in the soft parts of a baked product, as in the crumb of a bread product.

d) Grains should be available for immediate addition to bakery formulations on demand without die need for presoaking or other preparation steps requiring premeditation.

e) Grains should be available in both whole-grain and in particulate form, depending on the needs of the baker. The physical form of the grain as added to a particular product should be maintained through to the finished product. Thus the grains should be capable of withstanding the physical abuse imposed on bakery dough batters without suffering an unacceptable degree of physical breakdown or damage.

f) Grains should retain to a substantial degree the natural colour, flavour, fibre, vitamin and mineral content of the raw grain since consumers use grain breads for the claimed nutritional quality natural appearance and flavour attributes of such grain addition.

g) Grains should be so treated during manufacturing that the product made available for bakery ingredient usage is, if not sterile, at least does not carry excess microbiological contamination, and preferably is lower in microbiological load than other farinaceous ingredients used in the baked product.

SUMMARY OF THE INVENTION

According to a first embodiment of the present invention there is provided grain suitable for use in baked products, in which grain an extensive capillary network has been induced such that the grain is capable of rapid imbibition of moisture from a dough or batter, as a result of both said capillary network and the presence within the grain of one or more osmotically active solutes.

According to a second embodiment of the present invention there is provided a method of treating grain to ensure suitability for use in baked products comprising the steps of:

a) preconditioning grain to between about 12% and about 30% w/w of moisture;

b) subjecting preconditioned grain to physical action sufficient to induce an internal capillary network without causing grain to fragment;

c) subjecting grain which is a product of step b) above to a solution of osmotically active solutes under conditions to allow absorption of a required amount of solution.

Further, according to the second embodiment, the process may include the further step d) of tempering the grain which is a product of step c).

Still further, according to the second embodiment, the process may include the further step e) of drying grain which is a product of either step c) or step d) to produce grain which is stable for extended storage at ambient conditions.

According to a third embodiment of the invention there is provided grain produced according to the process outlined above.

According to a fourth embodiment of the invention there is provided a bakery product comprising grain treated by the process outlined above.

DETAILED DESCRIPTION OF THE INVENTION

Throughout this specification and the appended claims, unless the context requires otherwise, the words "include", "comprise", or variations such as "comprises" or "comprising", will be understood to imply the inclusion of a stated element or integer or group of elements or integers but not the exclusion of any other element or integer or group of elements or integers.

The novel products comprising this invention are grains which have a surprisingly powerful capability to imbibe moisture rapidly from the environment of a bakery dough or batter. This capability to imbibe moisture rapidly which may be termed imbibition potential (IP) derives from the characteristic in the grains (the imbibant) of enhanced capillary capability in conjunction with the osmotic influence of functional solutes present within the grains.

In order to achieve the enhanced capillary capability the grains are treated by any of several available methods such as sudden heating of the grains or subjecting the grains to sudden impact without destroying their wholeness. These methods may be referred to as physical action, or physical shock. Whatever method is used it is beneficial but not obligatory to subject the grains to heating to reduce the microbial load of the raw grain and to inactivate enzymes which may affect subsequent keeping quality. The capillary network produced in the grain may be a capillary web or network comprising microscopic fissures or cracks. This capillary network may be observed by standard light microscopy, amongst other techniques, for example, by sectioning a grain followed by microscopic analysis. The grain may thus be regarded as including or comprising a capillary network.

In order to induce the above mentioned osmotic influence within the grains, food grade solutes of selected types having useful osmotic potential may be readily introduced into the above described capillary web or network within the grains. The selected solutes may comprise one or more from a wide range of food-grade solutes as may be suitable for presence in the ultimate baked food product. Examples of solutes which may be introduced into the capillary web of the grains are various mineral salts of which common salt (sodium chloride) is an example, various sugars which may be either sweeter sugars such as sucrose, maltose or fructose or less sweet sugars such as glucose or lactose depending on the ultimate application, alcohols such as ethanol or glycerol and any other solute acceptable in the final food product which would be capable of contributing to the osmotic potential of the thus formed imbibant grain.

The solutes may be introduced into the physically treated grain in a solution preferably under conditions where substantially the total quantity of solution is absorbed into the capillary web of the grain. By using a system of substantial total absorption, as described, one can know accurately the concentration of osmotically active solutes and solvents in the imbibant grain. While soaking or steeping of grains in a solution is a possibility, it is less convenient and does not guarantee a knowledge of the precise concentration of osmotically active solutes and solvents in the imbibant grain. This is because the solvent and the solute or solutes present may be absorbed from a steeping solution into the physically treated grain at different rates. Exposing the physically treated grains to a spray of solution is also a possibility but such an approach suffers from the same disadvantages as soaking the grains in a suitable solution. The solute or solutes present may be absorbed into the physically treated grain at different rates from a steeping solution.

The invention allows for absorption of any other substances into the physically treated grain separately or at the same time as osmotically active solutes are introduced, preferably in a quantitatively controlled way, as described above.

The solvent used to form the solution of osmotically active solutes for quantitative introduction into the physically treated grains may be water or any other solvent or mixture of solvents which may be suitable for the particular product. Examples of some other suitable solvents include alcohols, especially ethyl alcohol and glycerol.

When absorption of the osmotically active solutes into the physically treated grain is complete, with or without a subsequent tempering period, the resulting imbibant grains may be used as such, or they may be preserved as such by a number of suitable methods, or they may be further treated to remove sufficient of the solvent to leave a shelf-stable form of the grain now containing the osmotically active solutes, hereinafter referred to as imbibant grains whether or not solvent has been removed. Optionally, before or after tempering, the imbibant grain may be further gelatinised.

It is found that imbibant grains of composition and structure in accordance with this invention when added to bakery doughs or batters have the ability to imbibe moisture rapidly from the dough or batter such that in the final baked product the imbibant grain will be soft and/or tender in the crumb and also in the crusty part of the baked food.

In practice it is found that the imbibant grains result when from about 1% to about 6% of sodium chloride (with or without other salts) more particularly 2–4% is introduced into the go physically treated grain. In addition, or alternately, up to about 20% of a sugar or mixture of sugars more particularly about 2% to about 10% or even more preferably about 3% to about 8% of a sugar or mixture of sugars may beneficially be introduced into the physically treated grain. In conjunction with salts and/or sugars, other osmotically active components may be used such as alcohols, in particular ethyl alcohol or glycerol as well as acids such as citric acid, acetic acid, lactic acid or salts thereof and the like or alkaline agents such as sodium bicarbonate, sodium citrate and the like. Other mineral salts may be used in conjunction with or as replacement for sodium chloride, for example potassium chloride.

In the above, the indicated percentages represent the weight of osmotically active solute in relation to the weight of treated grain at a moisture content of 12%.

The resulting imbibant grains take on an imbibition potential as a consequence of the above described controlled introduction of osmotically active solutes into the grain. That is, the imbibant grains have the potential to absorb solvent, such as water, rapidly from an environment, for example a dough or batter, until the imbibition pressure in the grain approximates to the osmotic pressure of the dough or batter.

If the imbibant grain is prepared by introducing solutes dissolved in water without subsequent moisture removal prior to use in a bakery product the imbibition potential may be calculated from the molal concentration of solutes in the free water phase in the imbibant grain, the free water phase being here regarded as the amount of moisture in excess of 12% for most grains.

If the imbibant grain so prepared is dried back to about 12% moisture, the imbibition potential is more difficult to quantify. The potential only becomes exerted when the imbibant grain becomes exposed to available free moisture. With progressive imbibition of moisture the imbibition potential is initially high and then decreases with increased moisture absorption due to dilution of the solutes.

In order to rationalise this variable situation so that imbibition potential may be expressed in a standard way, it is here calculated for a standard moisture content of an imbibant grain at 30% moisture in which it is assumed the solutes are in solution in the 18% of moisture referred to above as free water.

A molal solution theoretically has an osmotic pressure of 22.4 atmospheres at 0° C., and in practice has a pressure of about 24–27 atmospheres at 25 to 30° C.—the typical temperature of bakery doughs. It may be calculated that an imbibant grain at 30% moisture would have a negative imbibition potential numerically equal to the osmotic pressure as follows, depending oil the concentration of salts or sugars contained in the free water

| Wt of solute(s) contained in free water in 100 g of imbibant grain @ 30% moisture | Equivalent Osmotic Pressure based on 24 atmospheres for a 1 molal solution (1 atm = 14.7 pounds per square inch) |
| --- | --- |
| 2% NaCl | 45.6 atmospheres = 670 psi |
| 4% NaCl | 91.2 atmospheres = 1341 psi |
| 2% sucrose | 7.8 atmospheres = 115 psi |
| 10% sucrose | 39.0 atmospheres = 575 psi |
| 2% glucose | 14.8 atmospheres = 216 psi |
| 10% glucose | 74.0 atmospheres = 1088 psi |
| 2% salt + 5% glucose | 82.6 atmospheres = 1214 psi |

In fact, the pressures may be higher than as calculated above if dissociation of an electrolyte occurs. The pressures may also become higher if the free water molecules are bound to solutes such as sugars and this effectively increases the solute concentration relative to free water.

Development of Enhanced Capillarity in the Grains

An effective way of achieving this result comprises subjecting the grain to a controlled degree of physical shock or impact so as to induce an internal capillary web or network without actually destroying the wholeness of the grain. Impact or shock maybe in the form of for example, causing the grain to strike against a hard surface, by subjecting the suitably preconditioned grain to sudden heating and so effecting internal rupturing of tie grain substance due to moisture explosion, or by passing die grain, again suitably pre-conditioned, between two rolls, as in a bump mill or roller mill. In the last case it has been found effective to precondition the grain if necessary to about 12–30% moisture, then subject the grain to heating, for example in live steam at atmospheric pressure or at a pressure in excess of atmospheric pressure. Thereafter, while the grain is still hot it is passed between rollers at a suitable gap setting, dependent upon the size of the grain, so as to slightly flatten the grain and induce in the internal substance a capillary web of microscopic fissures or cracks without causing the grain to break into fragments. At the same time, the seed coat or bran layer of the grain will develop fine cracks but preferably without actual loss of any substantial proportion of said seed coat or bran layer. There is no particular limitation to the moisture content of the thus treated grain, or to the degree of gelatinisation induced by the heating process. It is of course desirable that processing conditions are chosen as will allow practicable handling of the grain at various stages of the process.

Induction of Enhanced Imbibant Capability

After a degree of enhanced capillarity has been induced in the grain it is treated with a solution of osmotically active solutes whereby the grain rapidly absorbs the solution, preferably to a controllable composition so that the resultant grain will have a known composition of solute or solutes and of solvent or solvents. A very satisfactory way of achieving this result is to mix the grain of enhanced capillarity gently with a known and pre-calculated weight of solution of known concentration of a solute or solutes until said solution is fully absorbed by said grain. If the grain is still warm or hot, the solution is absorbed into the capillaries of the grain in a matter of a few minutes.

As an alternative the grain of enhanced capillarity may be soaked in a solution of solutes of known concentration for a time sufficient to allow absorption of the required amount of solution. Thereafter the grain is removed from the solution and drained. This method, while, satisfactory, does not allow such accurate control of solute content because the amount of absorption of solution will vary with even small variations in temperature. There may also be variation in die rate at which the different solutes are absorbed in relation to the solvent. Unless this is carefully monitored the final composition of the imbibant grain will not be known with certainty.

A brief tempering period, for example, ten to twenty minutes, beneficially allows the absorbed solution to penetrate into the grain if the imbibant grain is to be dried back so that it is stable for extended storage at ambient conditions. For example drying to a final moisture content of between 12% to about 20% moisture may be appropriate depending upon the storage conditions likely to be encountered. However, such drying is optional.

Optionally the imbibant grain may be further gelatinised after absorption of solute or solutes before or after tempering. This may be achieved by any suitable method which will not cause significant loss of solutes from the imbibant grain, such as steaming, microwave heating, induction heating, radiant heating, infra-red heating and the like.

It is within the scope of the invention to produce both imbibant grains which have been dried back to the moisture content of the original grain used, for example, 12% and/or imbibant grains at an elevated moisture content (high moisture imbibant grains or HM imbibant grains).

The latter form of product, depending on the free water content, the solute content and the nature of the solute or solutes, may in fact be quite stable at normal ambient storage conditions. Alternately and if required, stability may be enhanced by such measures as storage at reduced temperature, ambient storage in the absence of oxygen, pasteurisation, use of natural or artificial preservatives to prevent microbial growth and the like. The presence of solutes in the grain has an influence on the water activity of the grain, such that the imbibant grain will have a higher moisture content than a non-imbibant grain of the same water activity.

HM imbibant grains when added to a bakery product preparation will absorb moisture from the dough to a particular target level more quickly than imbibant grains used at say 12% moisture. Hence there is less delay in achieving a high moisture content in the grains in the dough or batter when using HM imbibant grains. Additionally in the manufacture of HM imbibant grains, considerable economy is achieved since there is no drying operation required.

Grains treated according to the methods of the invention, can be incorporated into baked products by routine methods known in the art.

The present invention will now be described further, with reference to the following non-limiting examples.

EXAMPLE 1

In this example whole rye grains are treated so as to change them into imbibant rye for addition to bakery products. Standard dry rye grain at 11.0% moisture content was increased in moisture content to 17.5% by conventional methods well known in the milling industry, then tempered over-night. A further water addition was made, equal to 5% of the weight of the original rye. This was briefly mixed with the rye for a few minutes then allowed to rest about thirty minutes without moisture loss. The so-treated rye grains were heated in live dry steam at 100° C. for seventeen minutes, then passed while steaming hot between the smooth rolls of a roller mill set at a gap of 0.44 mm (ie 0.44 mm apart). This operation resulted in the development of a capillary network throughout the rye without destroying the wholeness and identity of the seeds. The rye was then mixed with a solution of sodium chloride and glucose in water comprising 2, 6 and 10 parts by weight respectively, relative to 100 parts by weight of the original dry rye used. This solution was sprayed on to the rolled rye while it was gently rotated in a tumbling-type mixer. The solution was fully absorbed by the rye in a few minutes, the total period of tumbling being about five minutes. Thereafter the so treated rye was further tempered about fifteen minutes then dried back to about 12% moisture content. The rye so treated was quite stable and may be described as imbibant rye. This imbibant rye was calculated to have an imbibition potential numerically equivalent to an osmotic pressure of 90 atmospheres or 1318 psi.

Imbibant rye prepared as above described was mixed with bread flour at a rate of 30% (baker's %) with other normal bread ingredients. [Baker's % defines components of a dough relative to the quantity of flour, as used for example in Practical Baking, Sultan, W. J., 5th Ed. Van Nostrand Reinhold, 115 Fifth Avenue, New York, N.Y., USA, especially page 108. The disclosure of this text is included herein in its entirety by way of reference.] Water was added at a rate of 60% for the flour component and 30% for the imbibant rye component (both baker's %), the dough was kneaded five minutes, formed and fermented in a bread tin to give a loaf of good volume then baked, cooled and packaged, then examined critically the following day. The imbibant rye was integral, soft and tender to eat where it formed part of the soft inner part of the loaf (the crumb). The imbibant rye was well expanded and resembled in appearance a natural rye grain. Where it formed part of the crust, it was also tender to chew. This is in marked contrast to untreated grains, heat puffed grains or steamed and lightly rolled grains added to bread, which remain hard and chewy in the crumb and extremely hard in the crust.

In subsequent experiments, up to about 50% of water relative to the weight of imbibant rye was added with very acceptable results in relation to tenderness of grain, dough handling and final bread quality.

EXAMPLE 2

In this example Australian standard white (ASW) wheat was treated to produce imbibant wheat suitable for use in bakery applications. Wheat at 10.8% moisture was pre-conditioned and then heated in live steam in a manner similar to rye in Example 1. The steaming hot wheat was rolled, the gap between the rolls being 0.64 mm. The wheat was mixed with a solution of salt, glucose and sucrose in water comprising 2, 3, 3 and 12.5 parts by weight respectively, relative to 100 parts by weight of original wheat used, in a manner as in Example 1. Part of the resulting imbibant wheat was dried back to about 12% moisture and part was used directly in making whole wheat bread in a manner as described in Example 1. However, since the high-moisture imbibant wheat already contained about 28% moisture the amount of water added to the formula was reduced by the amount of moisture in the imbibant wheat in excess of 12%. When the resultant whole wheat bread was critically examined, the wheat grains were moist and tender throughout the crumb and were tender and easy to chew where they occurred in the crusty part of the loaf. When the loaf was stored for several days the moist character of the crumb persisted indicating that the imbibant grains were no longer absorbing significant moisture. This is considered to be because the imbibant wheat rapidly achieved its full moisture absorbing potential relative to the water activity level of the freshly baked crumb. Bread baked using imbibant wheat which had been dried to 12% moisture produced finished baked bread similar to that where higher moisture imbibant wheat was used as long as appropriate adjustment was made to the amount of water added to the bread formula.

EXAMPLE 3

In this example yellow maize grits were treated to produce an imbibant version of this product. Maize grits, for example grits of about 1 to 1.5 mm in average minimum dimension, are added directly to bakery products to give an attractive yellow speckled appearance to the crumb and crust of breads. However the baking industry is very dissatisfied with the eating texture of unprocessed maize grits added to breads and the like.

Maize grits (12.5% moisture) of the type described above were pre-conditioned with water to bring the moisture content to 26%. A low level of an amylase (BAN240L, Novo Nordisk A/S, Denmark) was added to the moistening water at a rate of 0.1% of the dry grits. Use of amylase is optional. However it serves to achieve a higher degree of separateness in the steamed grains, to improve flavour and also to induce during steaming modest changes in the surface starch to osmotically active solutes. Since the grits are of much smaller size than whole grains, preconditioning could be completed at ambient temperature with slow tumbling in less than 1 hour. The tempered grits were steamed as in Example 1, then rolled using a gap of 0.24 mm between the rolls. The grits were quite separate and easy to handle. While the grits were still hot a solution of sodium chloride, glucose and sucrose in water comprising of 2, 3, 3 and 12.5 parts by weight respectively relative to 100 parts by weight of dry maize grits used was added by spraying on to the rolled grits while being gently tumbled in a rotary mixer. The solution was almost immediately absorbed totally by the grits. After a brief tempering of about fifteen minutes the imbibant maize grits were dried back to about 12% moisture. When baked into bread as has been described in Example 1 the maize grits were of bright yellow colour and extremely tender and moist in the crumb, and were also very tender within the crusty part of the loaf. By contrast maize grits of the same type which had not been converted to the imbibant form were hard and gritty and very unacceptable to consumers.

EXAMPLE 4

A series of imbibant wheats was prepared as in Example 2 without being dried except that in addition to the solutes added to the wheat after rolling vinegar was included such that the percentage of contained acetic acid relative to the dry wheat used was 0.2%, 0.4%, 0. 6% and 0.8%. The water used to produce the solution was reduced in quantity by the amount of water present in die vinegar used. The resulting high moisture imbibant wheat samples, containing 28% moisture were stored at ambient temperature in sealed moisture-vapour-resistant pouches. The same high moisture imbibant grains but without added vinegar were also packaged and stored under the same conditions. Within about 2 weeks the high moisture imbibant grains without vinegar addition had spoiled due to the vigorous growth of a variety of moulds. In contrast, the vinegar-containinig treatments did not develop mould growth and remained sound, fresh smelling and fresh tasting for several months.

High moisture imbibant grains containing vinegar were baked into a bread as described in Example 2, along with freshly made high moisture grains of similar solute composition except for absence of vinegar. Both breads fermented normally and produced breads which were indistinguishable in appearance and flavour. It is apparent that the vinegar was capable of preserving the imbibant grain but when diluted by the further moisture absorbed from the dough has no appreciable effect on the growth of yeast in the dough during fermentation or proving.

Other preserving agents may be used at selected concentrations as alternatives to vinegar depending on food regulations or controlling factors.

It is to be understood that modifications or alterations which would be considered obvious to a person skilled in the art, on the basis of the teaching herein, are also considered to fall within the scope and spirit of the invention as defined in the appended claims.

The claims defining the invention are as follows:

1. A method of osmotically treating a grain to be used in the preparation of a dough or batter for baked products, wherein said osmotically treated grain has rapid moisture-imbibing potential from the dough or batter as a result of an extensive induced capillary network and the presence within said osmotically treated grain of at least one osmotically active solute.

2. The method according to claim 1 wherein the solute is from about 1% to about 6% (weight to weight at 12% moisture content) of sodium chloride.

3. The method according to claim 1 wherein the solute is from about 2% to about 4% (weight to weight at 12% moisture content) of sodium chloride.

4. The method according to claim 1 wherein the solute is from about 0% to about 20% (weight to weight at 12% moisture content) of sugar.

5. The method according to claim 4 wherein the sugar is at least one of sucrose, fructose, glucose, lactose and maltose.

6. The method according to claim 1 wherein the solute is from about 2% to about 10% (weight to weight at 12% moisture content) of sugar.

7. The method according to claim 1 wherein the solute is from about 3% to about 8% (weight to weight at 12% moisture content) of sugar.

8. The method according to claim 1 wherein osmotically treated grain is whole grain or particulate grain.

9. The method according to claim 1 wherein osmotically treated grain is selected from the group consisting of whole grains or particulates of wheat, rye, barley, oats, linseed, maize, rice, soy, triticale, sunflower seeds, nuts, and mixtures thereof.

10. A method for preparation of a bakery product containing an osmotically treated grain having rapid moisture-imbibing potential which process includes the steps of:
   (a) adding the osmotically treated grain to a dough or batter to be used in the preparation of bakery products, the grain having rapid moisture-imbibing potential from the dough or batter as a result of an extensive induced capillary network and the presence within said osmotically treated grain of at least one added osmotically active solute; and
   (b) processing the batter or dough to prepare the bakery product.

11. The method of claim 10 wherein the osmotically treated grain is prepared by a method comprising the steps of:
   (a) preconditioning the grain to between 12% and 30% w/w moisture;
   (b) subjecting said preconditioned grain to physical action sufficient to induce an internal capillary network without causing the grain to fragment; and
   (c) subjecting the grain which is a product of step (b) to a solution of at lease one osmotically active solute under conditions to allow absorption of a required amount of the solute.

12. The method according to claim 11 which comprises the further step of:

(d) tempering the osmotically active grain which is a product of step (c).

13. The method according to claim 11 which comprises the further step of:

(e) drying the osmotically active grain which is a product of either step (c), or tempering the osmotically active grain which is a product of step (c) to produce grain which is stable for extended storage at ambient conditions.

14. The method according to claim 13 wherein said osmotically active grain is dried to between about 12% and about 20% moisture.

15. The method according to claim 11 wherein the solute is from about 1% to about 6% (weight to weight based on a 12% moisture content of sodium chloride.

16. The method according to claim 15 wherein the solute is from about 2% to about 4% (weight to weight based on a 12% moisture content) of sodium chloride.

17. The method according to claim 11 wherein the solute is from 0% to about 20% (weight to weight at 12% moisture content) of sugar.

18. The method according to claim 17 wherein the solute is from about 2% to about 10% (weight to weight at 12% mositure content) of sugar.

19. The method according to claim 18 wherein the solute is from about 3% to about 8% (weight to weight at 12% moisture content) of sugar.

20. The method of claim 17 wherein said sugar solute is at least one of sucrose, fructose, glucose, lactose or maltose.

21. The method according to claim 11 wherein the solute is selected from the group consisting of mineral salt, alcohol, vinegar, sugars, and mixtures thereof.

22. The method according to claim 11 wherein the solution comprises water as a solvent.

23. The method according to claim 11 wherein step (c) is conducted under conditions where there is substantially total absorption of solution into said grain.

24. The method according to claim 11 wherin said physical action comprises causing grain to strike against a hard surface, subjecting grain to sudden heating or passing grain through a bump or roller mill following a heating step.

25. The method according to claim 11 wherein said grain is whole grain or particulate grain.

26. The method according to claim 11 wherein said grain is selected from the group consisting of whole grains or particulates of wheat, rye, barley, oats, linseed, maize, rice, soy, triticale, sunflower seeds, nuts, and mixtures thereof.

27. A bakery product containing an osmotically treated grain having rapid moisture-imbibing potential prepared by the method comprising the steps of:

(c) adding the osmotically treated grain to a dough or batter to be used in the preparation of bakery products, the grain having rapid moisture-imbibing potential from the dough or batter as a result of an extensive induced capillary network and the presence within said osmotically treated grain of at least one added osmotically active solute; and (d) processing the batter or dough to prepare the bakery product.

28. The product prepared by the method of claim 27 wherein the osmotically treated grain is prepared by a method comprising the steps of:

(a) preconditioning the grain to between 12% and 30% w/w moisture;

(b) subjecting said preconditioned grain to physical action sufficient to induce an internal capillary network without causing the grain to fragment; and (c) subjecting the grain which is a product of step (b) to a solution of at least one osmotically active solute under conditions to allow absorption of a required amount of the solute.

* * * * *